United States Patent [19]

Morrison

[11] 4,098,490
[45] Jul. 4, 1978

[54] VALVE BODY-BONNET JOINT

[75] Inventor: Bertram L. Morrison, Houston, Tex.

[73] Assignee: ACF Industries, Incorporated, New York, N.Y.

[21] Appl. No.: 773,731

[22] Filed: Mar. 2, 1977

[51] Int. Cl.² ............................................. F16K 27/12
[52] U.S. Cl. .................................. 251/329; 251/367; 220/240; 220/353
[58] Field of Search ............... 220/240, 353, 354, 327; 251/367, 366

[56] References Cited

U.S. PATENT DOCUMENTS

| 1,828,478 | 10/1931 | Sparks | 251/329 |
| 3,007,600 | 11/1961 | Horner | 220/240 |

Primary Examiner—Arnold Rosenthal
Attorney, Agent, or Firm—Eugene N. Riddle

[57] ABSTRACT

A flange joint for a valve body and the associated bonnet has a planar flange sealing surface around the body opening and a mating flange around the bonnet. The valve body flange has a raised portion around an inner portion extending above a planar sealing surface. The bonnet flange has a substantially rigid outer portion and a deflectable inner portion with a planar flange sealing surface on the exposed side thereof. The deflectable portion contacts the body flange raised portion in sealing contact and is deflected as the flange sealing surfaces are brought together by fasteners. The bonnet member deflectable portion maintains a seal around the valve body flange in the event the fasteners relax under high temperature conditions or high pressure.

8 Claims, 5 Drawing Figures

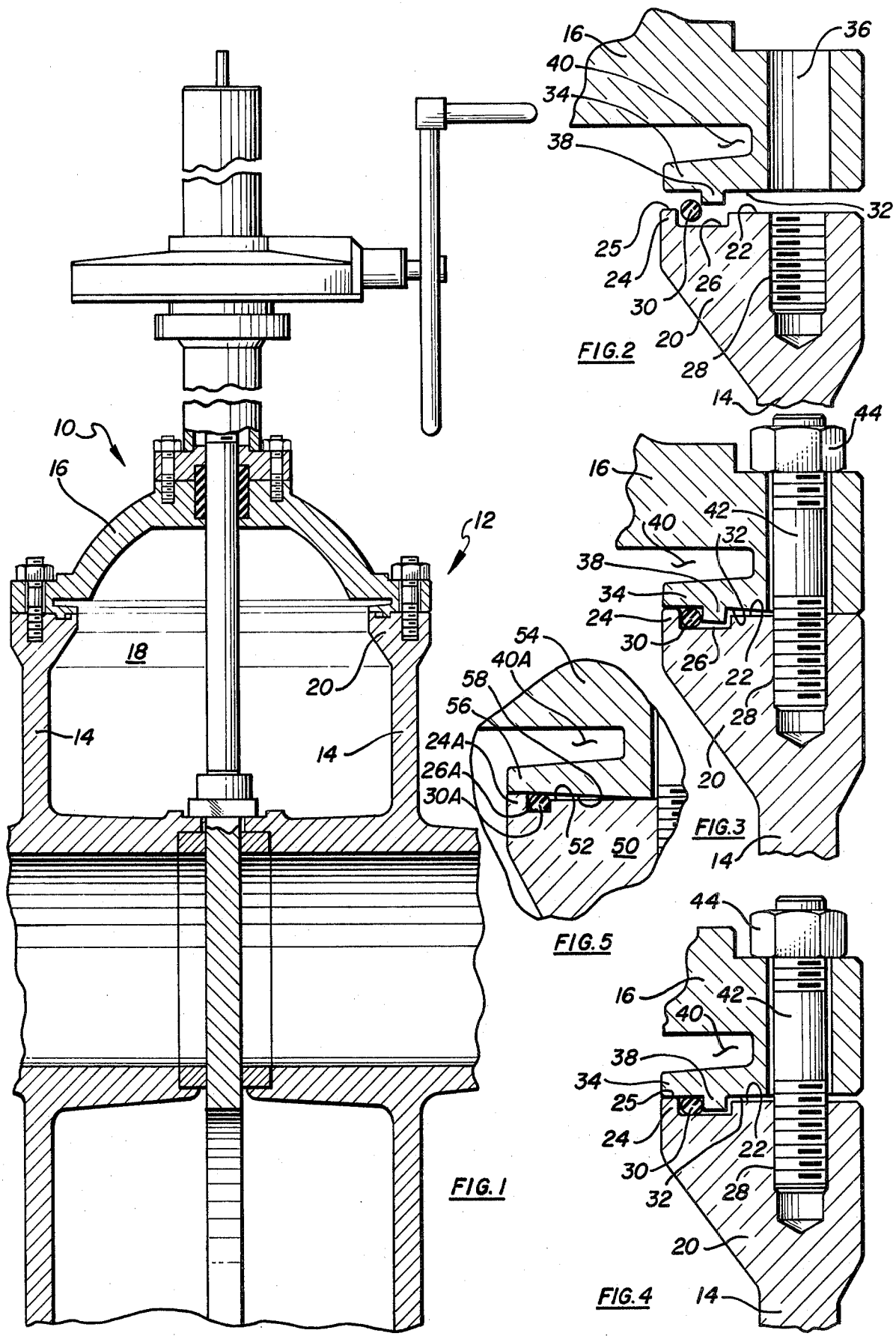

4,098,490

VALVE BODY-BONNET JOINT

BACKGROUND OF THE INVENTION

This invention is related to flanged connection joints for valve bodies. More particularly the invention is related to a body-bonnet joint for a valve which has a removably mounted bonnet secured to the valve body by a flanged connection.

In the prior art, flange connections between the bonnet and body on a gate valve are quite common as are flanged connections on the other portions of a valve body when such are provided. These flanged connections generally include some geometrical feature on both flange portions which locates the flange surfaces in a concentric relation. Also, commonly the flanges include some type of seal between the flanges to achieve fluid-tight sealing. It is well known in the art to provide an O-ring mounted in a groove in one or both of the flange members to seal between both flanges. A common problem in valve construction is providing joints which will withstand high temperature conditions which are encountered in some services and for emergency conditions such as a fire. When an elastomeric O-ring is mounted between the flange surfaces and it is exposed to high temperature conditions, the O-ring is usually blown out of the groove once the temperature becomes sufficient to permit the bolting around the flanged joint to relax thereby permitting separation of the flanges and providing an escape route for the O-ring. It is quite common for high temperature seal ring constructions to have a metallic O-ring or other substantially rigid seal material because of their resistance to high temperatures. However, these materials are not very resilient, thus, only a minor relaxation of the bolting is necessary to separate the sealing surfaces and create a leak. It is to be noted that most flange joints for the bonnet connection of a valve have some type of centralizing or locating structure to position the flanges with respect to each other and thus locate the stem passageway aperture in the bonnet relative to the valve member. Also, these typical flange connections have the locating structure and the flange joint seal on the interior of the bolt circle. By locating the flange seal inside the bolt circle, sealing around the bolts or fasteners is not necessary. Another feature common to the prior art is that compression of the flange seal member or gasket is provided only by tension of the bolting and thus relaxation of the bolt tension directly reduces the sealing ability of the flange joint. The typical construction is not suitable for valve installations in a high temperature environment because the bolts will relax or the valve body and bonnet structure will change shape and a leak is created.

SUMMARY OF THE INVENTION

The valve body-bonnet joint of this invention has a flange surface around the body and a mating flange around the bonnet. The valve body flange is provided with a raised portion extending above a planar sealing surface. The raised portion is located around an inner portion of the valve body flange. The bonnet flange is constructed with a substantially rigid outer portion and a radially inner deflectable portion. The bonnet flange sealing surface extends over an exposed surface of the deflectable portion and the substantially rigid portion. The deflectable portion contacts the valve body flange raised portion in metal-to-metal sealing contact and it is deflected when the planar flange sealing surfaces of the flanges are brought together by fasteners or bolts securing the bonnet to the valve body. Because of displacement of the deflectable portion relaxation of the bolts due to high temperature environments must be very large in order to be sufficient to separate the deflectable portion of the valve bonnet flange from the raised portion of the valve body flange.

One object of this invention is to provide a valve body-bonnet joint structure overcoming the aforementioned disadvantages of the prior art devices.

Still, one other object of this invention is to provide a valve body-bonnet joint structure which will seal in a high temperature environment by a metal-to-metal contact.

Still, another object of this invention is to provide a flanged joint for high temperature valve installations which utilizes fluid pressure within the valve body cavity to assist in creating and maintaining an effective fluid-tight metal-to-metal seal around the bonnet-body connection.

Various other objects, advantages, and features of this invention will become apparent to those skilled in the art from the following discussion, taken in conjunction with the accompanying drawing, in which:

DESCRIPTION OF THE DRAWING

FIG. 1 is a partially cutaway elevation view of the upper portion of a gate valve employing the valve body-bonnet joint connection of this invention;

FIG. 2 is an enlarged cross-sectional view of a segment of the valve body flange positioned in spaced relation to a segment of the bonnet flange with a seal ring positioned in a spaced relation therebetween with the view illustrating the free shape of the joint components of this invention prior to assembly thereof;

FIG. 3 is an enlarged cross-sectional view of a segment of the valve body-bonnet joint in the assembled condition with the bolts tightened and the planar sealing surfaces of the respective flanges in contact;

FIG. 4 is an enlarged cross-sectional view of the joint as shown in FIG. 3 with the joint in a position it can assume during exposure to a high temperature environment wherein the bolts are relaxed, the planar sealing surfaces are disposed in a spaced relation, and the deflectable portion of the bonnet flange is in sealing contact with the raised portion of the valve body flange; and FIG. 5 is an enlarged segmental view of an alternate flange construction embodying the novel features of this invention wherein the flanges are contructed without a position locator.

The following is a discussion and a description of preferred specific embodiments of the valve body-bonnet joint of this invention, such being made with reference to the drawing whereupon the same reference numerals are used to indicate the same or similar parts and/or structure. It is to be understood that such discussion and description is not to unduly limit the scope of the invention.

DETAILED DESCRIPTION

Reference is made to FIG. 1 of the drawing wherein such shows a gate valve indicated generally at 10 equipped with the valve body-bonnet joint of this invention which is indicated generally at 12. Valve body-bonnet joint 12 connects the valve body side wall 14 with the valve bonnet 16. Gate valve 10 is a typical through conduit slab type gate valve chosen to illustrate the connecting joint of this invention. Gate valve 10 is provided with inlet and outlet conduits having valve seats mounted therewith on opposite sides of the gate member. A stem is secured to the gate and extends through valve bonnet 16 to an actuator mounted on top of the valve bonnet. During normal operation the gate is positioned such that fluid can flow through the conduits. Depending upon the specific seat construction used, the valve body cavity 18 may or may not be subjected to a pressure substantially equal to flowline pressure. For through conduit style gate valves as shown, valve body pressure or fluid pressure in the valve body cavity 18 may be less than the flowline pressure. For non-through conduit style gate valves when they are in the open position the fluid pressure in the valve body cavity is the same as the flowline fluid pressure. The specific shape of the valve body flange portion of the structure may to some extent depend upon the cross-sectional shape of the valve in a direction transverse to the body. At this point it is to be noted that this body-bonnet joint can be used on any valve regardless of whether the body is cross-sectionally circular, rectangular, oval or any other shape.

The flange structure of the valve body includes an enlarged portion 20 of side wall 14 at one end of the valve body. The enlarged portion 20 is a thicker section of valve body side wall 14, with a planar body flange sealing surface 22 extending over the major portion thereof and a raised portion 24 extending above body flange sealing surface 22 around the innermost portion of the flange. Raised portion 24 has an annular sealing surface 25 on the top or exposed annular surface thereof. An annular recess 26 is provided radially outward of raised portion 24 extending substantially below body flange sealing surface 22. Recess 26 as shown has a rectangular cross-section when viewed in a direction transverse to the elongated axis of the valve body. A threaded aperture 28 extends into flange enlarged portion 20 to mount studs or bolts through flange sealing surface 22 into the flange. A plurality of such threaded apertures are provided in spaced relation around the body flange in alignment with valve body side wall 14. Recess 26 is formed sufficiently large in width to accommodate a seal ring 30 in a position adjacent to raised portion 24 and an annular protrusion from the valve bonnet flange. Recess 26 has upright side walls which are generally transverse to body flange sealing surface 22 and a bottom which is generally parallel to body flange sealing surface 22.

Seal ring 30 is preferably a ring of resilient sealing material that will sealingly engage sealing surfaces of the flanges to provide a low pressure fluid-tight seal. Seal ring 30 can be constructed in numerous shapes such as an O-ring, a rectangular cross-section ring or a cross-sectionally U-shaped ring. Also, seal ring 30 can be constructed of numerous materials such as elastomeric material, temperature resistant material such as asbestos, metallic material or any combination thereof. Preferably seal ring 30 can be constructed in the shape of an O-ring and of a high temperature resistant material such as an asbestos filled elastomer.

Valve bonnet 16 is provided with a flange around its perimeter. The valve bonnet flange is formed of a substantially rigid portion around the extreme perimeter of bonnet 16 and a cantilever deflectable portion 34 on the radially inner portion thereof. Bonnet flange sealing surface 32 extends over the exposed side of the flange rigid portion and deflectable portion 34. A plurality of apertures 36 extend through the bonnet flange rigid portion in a spaced relation corresponding to the locations of the valve body flange threaded apertures 28. The annular protrusion 38 extends from deflectable portion 34 and from body flange sealing surface 32 to engage the radially outer portion of recess 26. Protrusion 38 is generally rectangular in transverse cross-section as shown in FIG. 2. Protrusion 38 has generally parallel sides which are generally perpendicular to bonnet flange sealing surface 32 and it has an end surface which is generally parallel to bonnet flange sealing surface 32. Protrusion 38 and recess 26 are provided as a locating fixture for the flange structure only and are not necessary for the operation of the novel closure joint of this invention. It is to be understood that recess 26 and the protrusion 38 shown in the drawing and described herein are only representative of one such structure that can be used to locate the flanges relative to one another.

A novel feature of the bonnet flange is cantilever deflectable portion 34. Deflectable portion 34 is formed as an inwardly extending portion of the bonnet and it is located in a spaced relation to the raised portion of the bonnet which extends over the valve body opening. This deflectable portion 34 is a structurally circular cantilever beam secured on one end to the rigid peripheral portion of the bonnet. Because of this construction a fluid pressure zone indicated generally at 40 is formed between the raised portion of bonnet 16 and one side of deflectable portion 34. The fluid pressure zone is in fluid communication with valve body cavity 18. Pressure zone 40 is strategically located on the side of deflectable portion 34 which is opposite to the side that contacts raised portion 24. Because of the location of pressure zone 40, fluid pressure in valve chamber 18 causes a force to be exerted on deflectable portion 34 urging it away from the raised portion of bonnet 16 and in the direction of the valve body flange when assembled.

FIG. 3 shows the valve body-bonnet joint 12 in the assembled condition with bonnet 16 mounted on the valve body. Fasteners in the form of a plurality of studs 42 are mounted in threaded body flange apertures 28 and extend through bonnet apertures 36. Nuts 44 on the outer threaded ends of studs 42 secure bonnet 16 in place. As joint 12 is assembled deflectable portion 34 contacts raised portion 24 and is deflected or deformed slightly as nuts 44 are tightened and sealing surfaces 22 and 32 are brought together around the perimeter of the flanges. Because deflectable portion 34 is deformed it exerts substantial pressure on raised portion 24 and creates a fluid-tight metal-to-metal seal between raised portion sealing surface 25 and bonnet sealing surface 32. Seal ring 30 is compressed between the groove bottom and bonnet sealing surface 32. Protrusion 38 enters recess 26 radially outward of seal ring 30, however, it does not touch the groove bottom and it is desirably positioned in a spaced relation to the groove bottom. A small gap is present between sealing surface 22 and 32 at the radially outer disposed portion of recess 26. Because sealing surfaces 22 and 32 are substantially planar they lie in flush surface-to-surface contact from the radially outer portion of the gap to the perimeter of the flanges.

When the valve is put into use the fluid pressure in body cavity 18 usually increases above the pressure in the atmosphere surrounding the valve. Therefore, internal fluid pressure acts at the juncture of raised portion sealing surface 25 and bonnet flange sealing surface 32. In the event of leakage of this seal around the annulus portion of the flanges, fluid pressure is exposed to the annulus portion of seal ring 30 which will displace seal ring 30 radially outward and urge it into sealing relation with the annulus side portion of protrusion 38 on the bonnet thereby containing the fluid within the valve body cavity. Additional sealing is created between the flange sealing surfaces 22 and 32 around the rigid peripheral portion of bonnet 16 and the adjoining portion of the valve body flange. Generally speaking, seal ring 30 provides for low pressure sealing of the body-bonnet joint whereas the metal-to-metal or surface-to-surface sealing of the raised portion and the flange structure provides high pressure and high temperature sealing.

When a valve having the body-bonnet joint of this invention is exposed to high temperatures, for example 300° F. and above, it can be expected that the fasteners, studs, bolts, and the like on the valve will relax thereby causing a separation of the pressure containing parts of the structure. FIG. 4 illustrates the body-bonnet joint connection in such a high temperature condition. Stud 42 is shown in a relaxed condition which effectively lengthens the stud thereby causing separation of sealing surfaces 22 and 32 around the peripheral portion of the flanges. In this relaxed condition deflectable portion 34 is deformed only slightly due to separation of the flanges and it maintains sealing contact with raised portion sealing surface 25. For fastener relaxations which are not so large as to displace deflectable portion 34 from raised portion 24, a fluid seal can be retained around raised portion sealing surface 25 regardless of the fluid pressure in valve body cavity 18.

At this point it is important to note the advantageous features of the pressure zone 40. When the fasteners are relaxed the forces urging deflectable portion 34 into contact with the body flange are reduced. However, when body cavity pressure is substantially above the surrounding pressure of the valve then deflectable portion 34 is urged toward the valve body flange due to the pressure differential existing on opposite sides of the deflectable portion. Obviously, for high differential pressures the forces urging deflectable portion 34 toward the valve body flange will be higher. The bolting configuration and dimensions of deflectable portion 34 and raised portion 24 must necessarily be selected such that a surface-to-surface seal will be retained on raised portion surface 25 during all of the normal expected operating conditions and temperature environments for a particular valve. It is important that these parameters can also be adjusted to provide for sealing in the event of an extremely high temperature condition such as in a fire.

Seal ring 30 functions to seal between the flanged surfaces and depending upon the material of seal ring it may or may not be effective at the higher temperatures. Preferably seal ring 30 is constructed of a material which will withstand substantially high temperatures without decomposition, thus, continue to seal in a high temperature environment. For example, a metallic seal ring can be used or a seal ring comprised partially of an asbestos base material. When the fasteners are relaxed as shown in FIG. 4 seal ring 30 is displaced radially outward and will continue to seal between the bottom of recess 26 and the annulus side of protrusion 38.

In order to clearly illustrate the novel function and structure of this invention the following example is provided. For purposes of illustration a typical conduit style gate valve particularly constructed for service in temperatures over 600° F. has a nominal flow passageway diameter of 24 inches, a valve body outside diameter of approximately 30 inches, a bolt circle diameter of around 29 inches containing approximately 28 studs as shown in FIG. 1. The valve body flange is constructed with raised portion 24 having sealing surface 25 extending approximately 0.012 inch above body flange sealing surface 22. The bonnet flange is constructed with deflectable portion 34 being approximately 40% of the transverse width of the bonnet flange and approximately 0.375 inch in thickness. The studs and bolts which make up the fasteners are essentially standard valve hardware and are not assumed to be specifically for use in high temperature environments.

Upon assembly of the valve of this example deflectable portion 38 is deflected or displaced the 0.012 inch height of raised portion 24 and seal ring 30 is compressed between the bottom of recess 26 and bonnet sealing surface 32 as the flange sealing surfaces are brought in contact. Seal ring 30 is compressed sufficiently to establish a low pressure fluid-tight seal between the flange sealing surfaces. The portion of bonnet flange surface 32 which contacts raised portion sealing surface 25 is urged into metal-to-metal surface-to-surface sealing contact because of the forced deformation of deflectable portion 34.

When the valve of this example is in normal use and operation, the fluid-tight seal established by the metal-to-metal contact of deflectable portion 34 with raised portion 24 and by seal ring 30 retains fluid within the valve body cavity. Once the valve is subjected to temperatures above its normal operating range, the studs relax because of the high temperature condition and thus allow separation of the flange sealing surfaces as shown in FIG. 4. In the valve of this example, a high temperature of approximately 1000° F. will cause a relaxation of the studs sufficient to cause a flange sealing surface separation of approximately 0.004 inch which is less than the separation necessary to cause separation of raised portion 24 and deflectable portion 34. Fluid pressure in body cavity 18 communicates with pressure zone 40 so the fluid pressure differential across the body-bonnet joints cooperates in an assisting manner with the inherent resiliency of deflectable portion 34 to urge the deflectable portion toward raised portion 24 in order to maintain fluid-tight sealing around the body-bonnet joint. Seal ring 30 may be rendered useless depending upon its material composition and the temperature involved. Because of the strategic position of pressure zone 40, even a minimal pressure differential such as 150 pounds per square inch will assist in urging deflectable portion 34 toward the body flange, however, higher pressures will provide greater forces.

FIG. 5 illustrates an additional structural embodiment of a flanged joint connection for a valve which incorporates the novel valve body-bonnet joint connection of this invention; however, such does not have a flange positioning structure. Portions of this structure shown in FIG. 5 which are similar to structure described above are given the same numerals followed by the letter "A". The valve body enlarged side wall portion 50 is provided with a planar flange sealing surface 52. Protrusion 24A extends above sealing surface 52 around the inner annular portion of valve body flange. A recess 26A in valve body sealing surface 52 is located immediately radially outward of raised portion 24A and receives and mounts a seal ring 30A. The bonnet flange 54 is constructed with a deflectable portion 56 extending radially inward from a substantially rigid outer portion of the bonnet. Bonnet flange 54 has a sealing surface extending over the exposed side of the rigid portion and the deflectable portion 56. Bonnet flange sealing surface 58 rests in flush surface-to-surface sealing contact with the peripheral portions of body flange sealing surface 52 when the members are positioned as shown in FIG. 5. A fluid pressure zone 40A is created between deflectable portion 56 and the upper portion of the valve bonnet. The alternate construction shown in FIG. 5 functions the same as the body-bonnet joint described in detail above and for this reason will not be repeated here but such description is incorporated by reference.

It is to be noted that the novel joint construction of this invention is not to be restricted solely to the joint connection between a gate valve body and a gate valve bonnet for the reason that it is usable with ball valves to connect the body and the tailpiece and additionally, it is usable on other flanged connections. Examples of other flanged connections are the flange connections on a valve such as around auxiliary apertures or access openings in the valve body or bonnet structure, the bonnet and stem connection, and the flowline flanges. It is obvious that the novel construction with the raised portion, the deflectable portion, and the pressure assisted seal are features which are desirable for all flanges on a valve or flowline structure not just on the body-bonnet connection joint. By utilizing the novel joint of this invention on a valve around the flowline flanges, on any auxiliary flanges, on the body-bonnet joint connection and on the stem connection, it will prevent leakage during high temperature conditions.

As is apparent from the foregoing description of the applicant's body-bonnet joint structure, such provides a relatively inexpensive and extremely effective flange coupling joint for various joint connections on a valve or in a flowline where a fluid-tight seal is needed in high temperature environments. The joint construction is pressure assisted so that increased pressure within the pressure containing vessel assists in sealing and additionally, the structure is constructed so that normal relaxation of bolting in high temperature conditions does not effect the sealing capability of the flange connection.

What is claimed is:

1. In a gate valve having a valve body defining a valve chamber, inlet and outlet fluid passageways and containing a valve member movable between open and closed positions wherein said valve body has a bonnet mounted on one end portion thereof, a valve body-bonnet connection joint, comprising:
    (a) a valve body flange on one end of said valve body, said body flange having an essentially planar sealing surface and having a raised radially inner portion extending beyond the plane of said sealing surface;
    (b) a bonnet flange on said bonnet having a substantially rigid radially outer portion and an inwardly extending deflectable cantilever portion, said bonnet flange having a planar sealing surface on an exposed side thereof to contact said valve body flange surface; and
    (c) a plurality of fasteners spaced around said valve body and extending from said body flange and through said bonnet flange substantially rigid radially outer portion, said fasteners tightening said bonnet to said valve body and thereby deflecting said cantilever portion upon tightening of said fasteners to urge said raised portion into sealing contact with said bonnet flange sealing surface and to initially bring said body flange sealing surface into contact with said bonnet flange sealing surface, said fasteners being adapted to relax upon exposure to high temperature a small amount insufficient to cause disengagement of said bonnet flange sealing surface and said raised portion.

2. The valve body-bonnet connection joint of claim 1, wherein:
    (a) said body-bonnet connection joint has a seal means between said bonnet flange and said valve body flange including a resilient seal member disposed between said flanges and sealingly engaged therewith;
    (b) said valve chamber has a fluid pressure zone on the side of said bonnet flange cantilever portion opposite to said planar sealing flange to urge said cantilever portion toward said body flange when fluid pressure in said valve chamber is greater than fluid pressure outside said valve body.

3. The valve body-bonnet connection joint of claim 1, wherein:
    (a) said valve body flange has an annular seal means between said bonnet flange and said valve body flange including an annular recess around said valve body flange and an annular seal ring member positioned in said recess and in sealing contact with said bonnet flange sealing surface and said valve body flange;
    (b) said valve body-bonnet connection joint additionally including a position locating means having one portion on said bonnet flange and a mating portion on said valve body flange to position said bonnet flange in concentric relation with respect to said valve body flange; and
    (c) said raised portion located around the innermost annular portion of said valve body flange.

4. The valve body-bonnet connection joint of claim 3, wherein:
    (a) said position locating means has an annular protrusion extending from said bonnet flange and engageable in said annular recess; and
    (b) said seal ring is constructed of a high temperature resistant and resilient material.

5. A connecting sealing joint for a valve body opening and a closure member comprising:
    (a) an essentially rigid body flange around an opening in a valve body, said body flange including an essential planar flange sealing surface around the radially outer portion thereof, and a raised portion around an inner portion of said body flange and extending substantially above the plane of said body flange sealing surface;
    (b) a closure member flange around a closure member for said valve body opening wherein said closure member flange being formed of a substantially rigid radially outer portion and a deflectable radially inner portion, said closure flange having an essentially planar sealing surface on the exposed side thereof to sealingly contact said body flange sealing surface and said raised annular portion, said deflectable radially inner portion contacting said raised portion during assembly and being deflected upon further displacement of said closure member toward said body flange surface, said closure member flange surface being in surface-to-surface sealing contact with said body flange sealing surface around said raised portion;
(c) a resilient seal means between said closure member flange and said body flange including a resilient seal member disposed between said flanges and sealingly engaged with said flanges;
(d) a position locating means having one portion on said closure member and a corresponding mating portion on said valve body to position said closure member flange in concentric relation with said valve body flange; and
(e) a plurality of fasteners extending from said valve body through said body flange and said closure flange rigid radially outer portion in a spaced relation to secure said closure member to said valve body.

6. The connecting sealing joint of claim 5, wherein said closure member flange further includes a fluid pressure means to urge said deflectable member toward said raised portion.

7. The connecting sealing joint of claim 6, wherein:
(a) said raised portion extends from a radially inner portion of said body flange and said deflectable portion extends radially inward to substantially cover said raised portion;
(b) said fluid pressure means has a fluid pressure zone in fluid communication with the interior of said valve body and located on the side of said deflectable portion opposite to said closure flange planar sealing surface operable to exert fluid pressure on said deflectable portion when fluid pressure inside said valve body is substantially greater than fluid pressure outside of said valve body.

8. The connecting sealing joint of claim 7, wherein:
(a) said seal means includes an annular recess in said body flange radially outward of said raised portion and a resilient seal ring located in said annular recess, with said recess being substantially radially larger than said seal ring and forming a portion of said position locating means;
(b) said position locating means including an annular protrusion extending from said closure member flange sealing surface sufficient to engage a radially outer portion of said recess with said seal ring contacting the annulus of said ridge, said ridge being so positioned to locate said closure member flange in concentric relation with said valve body flange.

* * * * *